US011806785B2

(12) United States Patent
Avdovic et al.

(10) Patent No.: US 11,806,785 B2
(45) Date of Patent: Nov. 7, 2023

(54) 3D PRINTING METHOD AND TOOL (71) Applicant: Siemens Energy Global GmbH & Co. KG, Bayern (DE)

(72) Inventors: Pajazit Avdovic, Norrkoping (SE); Jonas Eriksson, Finspong (SE); Jerry Fornander, Finspang (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/793,394

(22) PCT Filed: Jan. 15, 2021

(86) PCT No.: PCT/EP2021/050829
§ 371 (c)(1),
(2) Date: Jul. 16, 2022

(87) PCT Pub. No.: WO2021/151691
PCT Pub. Date: Aug. 5, 2021

(65) Prior Publication Data
US 2023/0052734 A1 Feb. 16, 2023

(30) Foreign Application Priority Data
Jan. 29, 2020 (EP) ..................... 20154369

(51) Int. Cl.
*B22F 10/85* (2021.01)
*B33Y 50/02* (2015.01)
(Continued)

(52) U.S. Cl.
CPC ............. *B22F 10/85* (2021.01); *B22F 5/009* (2013.01); *B22F 10/30* (2021.01); *B33Y 10/00* (2014.12);
(Continued)

(58) Field of Classification Search
CPC ...... Y02P 10/25; G06F 2113/10; G06F 30/20; B33Y 10/00; B33Y 30/00; B33Y 40/20;
(Continued)

(56) References Cited

U.S. PATENT DOCUMENTS 10,751,951 B1\* 8/2020 Nguyen .................. B22F 7/062
2014/0255198 A1 9/2014 El-Wardany
(Continued)

FOREIGN PATENT DOCUMENTS

| CN | 103624257 A | 3/2014 |
|---|---|---|
| CN | 107206488 A | 9/2017 |

(Continued)

OTHER PUBLICATIONS

PCT International Search Report and Written Opinion of International Searching Authority dated Jan. 4, 2021 corresponding to PCT International Application No. PCT/EP2021/050829 filed Jan. 15, 2021.

*Primary Examiner* — Yuhui R Pan
(74) *Attorney, Agent, or Firm* — WOLTER VAN DYKE DAVIS, PLLC (57) ABSTRACT

A 3D printing method providing an improved manufacturing process by providing a plurality of layers forming at least a part of the component, wherein the plurality of layers contains at least one first layer part and at least one second layer part, wherein the at least one first layer part and the at least one second layer part have been manufactured with different manufacturing speeds.

15 Claims, 4 Drawing Sheets

(51) Int. Cl.
  *B33Y 10/00*    (2015.01)
  *B22F 10/30*    (2021.01)
  *B22F 5/00*     (2006.01)
  *B33Y 30/00*    (2015.01)
  *B33Y 80/00*    (2015.01)

(52) U.S. Cl.
  CPC ............... *B33Y 50/02* (2014.12); *B33Y 30/00* (2014.12); *B33Y 80/00* (2014.12)

(58) Field of Classification Search
  CPC ......... B33Y 50/00; B33Y 50/02; B33Y 80/00; B29C 64/153; B29C 64/264; B29C 64/393; B22F 10/14; B22F 10/28; B22F 10/30; B22F 10/36; B22F 10/366; B22F 10/38; B22F 10/66; B22F 10/80; B22F 10/85; B22F 2003/247; B22F 2998/00; B22F 2999/00; B22F 5/009; B22F 5/04
  See application file for complete search history.

(56) References Cited

U.S. PATENT DOCUMENTS

| | | | |
|---|---|---|---|
| 2015/0331402 A1* | 11/2015 | Lin | H04N 1/603 |
| | | | 700/119 |
| 2016/0151860 A1 | 6/2016 | Engeli | |
| 2018/0200798 A1* | 7/2018 | Sharon | B22F 7/06 |
| 2018/0333918 A1 | 11/2018 | Sohn et al. | |
| 2018/0370216 A1 | 12/2018 | Mironets et al. | |
| 2019/0299287 A1* | 10/2019 | Karlsson | B22F 12/67 |
| 2019/0299290 A1 | 10/2019 | Kuhns et al. | |

FOREIGN PATENT DOCUMENTS

| | | |
|---|---|---|
| CN | 110434331 A | 11/2019 |
| CN | 110523981 A | 12/2019 |
| EP | 3498401 A1 | 6/2019 |
| JP | 2008189956 A | 8/2008 |

* cited by examiner

3D PRINTING METHOD AND TOOL

CROSS REFERENCE TO RELATED APPLICATIONS

This application is the US National Stage of International Application No. PCT/EP2021/050829 filed 15 Jan. 2021, and claims the benefit thereof. The International Application claims the benefit of European Application No. EP20154369 filed 29 Jan. 2020. All of the applications are incorporated by reference herein in their entirety.

FIELD OF INVENTION

The present invention refers to a 3D printing method providing an improved manufacturing time/quality ratio. Additionally, the present invention refers to a component manufactured according to the inventive method. Furthermore, the present invention refers to a computer program product adapted to provide such method. Additionally, the present invention refers to a storage device containing such computer program product. Furthermore, the present invention refers to a system being adapted to execute such method. Additionally, the present invention refers to an 3D printing device being connected to or containing such computing device. Furthermore, the present invention refers to a use of manufacturing instructions adapted to realize the inventive method.

BACKGROUND OF INVENTION

Additive manufacturing is very flexible method of manufacturing utilizing building up a product by adding material on an existing part or right from the scratch. Herein, 3D printing utilizes this method to build up at least a part of a component by placing layer upon layer to provide the desired component. In recent years the possibilities provided by such method significantly improved and this new method of manufacturing products has been introduced into industrial processes. Especially, the possibility to build up structures utilizing geometries not possible using conventional methods of manufacturing significantly increases the benefit provided herewith. 3D printing, for example, utilize a metal or metal composition powder being melted layer by layer to manufacture a complex 3D structure. However, the time required to manufacture a product utilizing such method is typically quite high. Herein, a balance of quality and time of production is to be achieved. A faster manufacturing speed, for example, is achieved by melting thicker layers of powder material in selective laser melting process. However, such decision, for example, results in remelting deeper layers. Also, the surface properties of the corresponding part of the component are typically rougher. Time gained by the increased manufacturing speed might be lost again based on postprocessing steps required like grinding steps to provide a smoothened surface. In case the structural stability is impaired the overall component might even not be usable anymore. To provide overall better results while guaranteeing, for example, the usability of the manufactured component it is, thus, continuously required to optimize the method and provide improved processes.

SUMMARY OF INVENTION

This and further problems are solved by the products and methods as disclosed hereafter and in the claims. Further beneficial embodiments are disclosed in the dependent claims and the further description and figures. These benefits can be used to adapt the corresponding solution to specific needs or to solve additional problems.

According to one aspect the present invention refers to a method of providing manufacturing instructions for manufacturing a component using 3D printing, wherein the manufacturing method contains at least the steps of providing a plurality of layers forming at least a part of the component, wherein the plurality of layers contains at least one first layer part and at least one second layer part, wherein the at least one first layer part and the at least one second layer part have been manufactured with different manufacturing speeds. The term "layer part" as used herein refers to a plurality of neighboring layers provided by the 3D printing manufacturing method utilized to provide the component. The term "different manufacturing speeds" as used herein refers to different speeds to manufacture a comparable amount of the component. For example, a layer of the at least one first layer part and a layer the at least one second layer part providing the same thickness have been manufactured, wherein the time required to print 4 cm$^2$ of the layer of the at least one second layer part is 20% lower. Or the layer of the at least one first layer part and the layer of the at least one second layer part require the same time for printing the same surface area, however, the thickness of the second layer is 40% bigger. Resulting in an overall increased manufacturing speed of the part of the component containing the second layer part. Thus, the present different manufacturing speeds result in a different speed of manufacturing based on the amount of material of the component manufactured in relation to the time required. Herein, time is preferably taking into account the not usable time resulting from, for example, the application of a metal powder layer to be melted to provide the next layer of the component. The term "manufacturing instructions" as used herein refers to data that can be processed by a 3D printing device to manufacture the component. Preferably, it also contains data with regard to the 3D printing parameters like the energy introduced, the movement speed of a laser beam or electron beam, the movement pattern of a laser beam or electron beam, or the like.

For example, such different manufacturing speeds can be achieved by providing thicker raw material layers, like powder layers, preferably metal powder layers, and/or utilizing different beam parameters like laser beam parameters or electron beam parameters and/or depositing a bigger amount of raw material like binder jetting raw material during the same time. Increasing, for example, the intensity of the laser beam allows to provide a faster movement of the laser to melt the complete layer. However, such fast movement and more intense introduction of energy can easily influence the properties of this part of the component and easily decreases the precision obtainable by a slower melting process. Herein, also the type of application of the energy can be selected accordingly. Utilizing a pulsed laser is typically slower and more precise, while a continuous laser is faster and less precise. Also, during a process like binder jetting the application speed of the raw material can be sped up by increasing the feed rate of the raw material. This can be achieved, for example, by increasing the pressure of the corresponding nozzle to increase the amount of raw material deposited over time. Herein, increasing such deposition rate easily results in unforeseeable deviations, for example, based on inhomogeneous flow behavior of the solid component-binder mixture under such increased pressure. Additionally, other features are foreseeable like a change of the exterior of the layer providing a different geometry.

According to a further aspect the present invention refers to a component manufactured according to the inventive method. It was noted that corresponding components can be accordingly designed and provide the required reliability and quality despite being able to significantly reduce the manufacturing time of such components. This allows to significantly increase the industrial applicability of 3D printing and correspondingly manufactured components. It is still possible to identify the correspondingly manufactured component by, for example, providing a cross-section of the specific component and analyzing the layers by means of physical, chemical, or other processes. However, the user using the component in its intended application does not note any difference based on the optimized design and the tailored characteristics despite the reduced manufacturing time.

According to a further aspect the present invention refers to a computer program product, tangibly embodied in a machine-readable storage medium, including instructions operable to cause a computing entity to execute an inventive method. Surprisingly, it was noted that it is possible to provide a computer program product to automatize the provision of the manufacturing instructions.

A preferred method to automatize such provision of the manufacturing instructions utilize acquired experiences and data to provide such improved layer design decreasing the time required while decreasing the quality as low as possible or not at all. Additionally or alternatively it is possible to use, for example, machine learning to optimize the design.

According to a further aspect the present invention refers to a storage device for providing an inventive computer program product, wherein the device stores the computer program product and/or provides the computer program product for further use.

According to a further aspect the present invention refers to a computing device adapted to provide manufacturing instructions for an 3D printing device, wherein the computing device is adapted to execute the inventive method or contains an inventive computer program product. It was noted that, for example, providing a stand-alone computing device is very beneficially utilized in an established 3D printing workshop. Herein, such computing device is provided and eventually interacts, for example, with a distributed database. The established data transfer of the manufacturing instructions to the 3D printing devices can, for example, be rerouted through such inventive computing device allowing to process the data accordingly. The computing device can be provided as separate unit being independent from existing hardware already available. Herein, different embodiments as described hereafter can also be realized. In case the production should be further optimized or different or additional benefits should be obtained the computing device can be exchanged to immediately change the process without interrupting the workflow.

According to a further aspect the present invention refers to a 3D printing device connected to preferably containing, an inventive computing device. Herein, such connection is preferably adapted to be permanently available. For example, it can be some hardware connection being only interrupted by electronic means and/or temporarily by hardware means. Such possibility to interrupt the connection is typically beneficial for the reason of data security and to avoid that the 3D printing devices can directly be tampered with. Also, such connection can, naturally, be interrupted for the reasons of maintenance and/or upgrades.

According to a further aspect the present invention refers to a use of manufacturing instructions for manufacturing a component using 3D printing, wherein the manufacturing instructions contain a 3D printing method step, wherein the 3D printing method step contains providing a plurality of layers forming at least a part of the component, wherein the plurality of layers contains at least one first layer part and at least one second layer part, wherein the at least one first layer part and the at least one second layer part have been manufactured with different manufacturing speeds.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

Preferably, the embodiments hereafter contain, unless specified otherwise, at least one processor and/or data storage unit to implement the inventive method.

In the following the invention will be exemplarily refer to continuous flow engines like compressors or gas turbines. It was noted that the application of the invention in such area is especially beneficial. In more detail it was noted that, for example, the extreme requirements with regard to the overall quality of components utilized in this field provides a significant challenge. Simultaneously, huge amount of data and experience has been collected, for example, allowing to predict the strain and wearout of corresponding components. Also, it is to be expected that even more complex designs will be introduced into the market in the near future resulting in the desire to reduce the production and repair costs to provide improved systems with reasonable prices. According to further embodiments it is preferred that the inventive method is utilized for components of continuous flow engines like compressors, gas turbines and steam turbines, more preferred gas turbines and steam turbines, even more preferred gas turbines. It was noted that the inventive method is especially beneficially applied to components to be exchanged during maintenance of such devices.

According to one aspect the present invention refers to a method as described above.

3D printing methods as part of additive manufacturing methods are well established despite being relatively new in industrial applications. These methods provide a high potential to complement or replace existing conventional methods of manufacturing. The additive manufacturing methods are characterized by that a material is applied without some limiting element like some casting mold to build up the product. Examples of especially useful additive manufacturing methods also representing 3D printing methods are selective laser melting, electron beam melting and binder jetting. Such methods, for example, build up a product utilizing a material that is removed in a later step like it is done for binder jetting. Very useful for the current application are 3D printing additive manufacturing methods like selective laser melting and electron beam melting building up the product from a powder, wherein the powder is melted layer by layer. By repeating this melting process for each layer the 3-dimensional product is provided.

It was noted that it is typically beneficial to characterize a minimum amount of layers to be provided by such first layer part and second layer part. According to further embodiments it is preferred that the at least one first layer part and/or the at least one second layer part contain at least 10 layers, more preferred at least 20 layers, even more preferred at least 40 layers. Typically, it is preferred that the at least one first layer part and the at least one second layer part provide such minimum number of layers. It was noted that this significantly simplifies and improves the reliability of simulations and assessments regarding the acquired characteristics of the component.

The inventive methods can furthermore be utilized so that the component provides different surface qualities at different locations. According to further embodiments it is preferred that the component provides at least one first part of the component containing the at least one first layer part and at least one second part of the component containing the at least one second layer part, wherein the first part and the second part provide different surface qualities. Typically, it is preferred that the at least one first part of the component consists of the at least one first layer part of the component and that the at least one second part of the component consists of the at least one second layer part. It was noted that such utilizing an adapted design resulting in such modified surface quality is advantageous for typical embodiments. In this context, differentiating between areas requiring high surface qualities and areas requiring lower surface qualities allows to significantly reduce the manufacturing time while providing the required overall quality of the component. For example, such surface quality can be measured as roughness of the surface.

Additionally, it was noted that postprocessing steps are beneficially considered. According to further embodiments it is preferred that the method takes into account a possible and/or a required postprocessing step, wherein the position and/or size of the at least one first layer part and/or the position and/or size of the at least one second layer part takes into account the modification resulting from the possible and/or required postprocessing step. For example, a significant amount of time can be saved by reducing the surface quality of parts of the component being easily postprocessed. Simultaneously, considering, for example, parts of the component difficult to be postprocessed or even not possible to be postprocessed can be kept in mind to exclude corresponding parts from such optimization. Especially considering already available postprocessing steps to be utilized and correspondingly designing the manufacturing instructions to make use of corresponding later correcting steps surprisingly leads to a significant improvement. For example, a user can define corresponding areas by a single click while the final arrangement of the layer parts is done automatically.

Also, for many embodiments it is possible to introduce different material qualities into these different layer parts. According to further embodiments it is preferred that the at least one first layer part and the at least one second layer part provide different material qualities. Examples of such different layer qualities are mechanical stability and thermal resistance. Such different material qualities can result from different materials utilized during the 3D printing process, but preferably are resulting from the different processing resulting in especially a different microstructure within the first layer part and the second layer part. For example, the 3D printing process parameters can be strictly controlled and optimized to provide some microcrystalline structure to grow and provide improved characteristics within one layer part. Simultaneously, the process parameters in the other layer part are primarily taking into account a high processing speed resulting in a less defined microstructure with slightly decreased properties. For example, a higher amount of energy is introduced to melt a thicker layer of power the raw material in a short amount of time without strictly considering the resulting material characteristics.

It is also possible that the process parameters of the 3D printing process during the 3D printing of the at least one first layer part can differ from the process parameters during the 3D printing of the at least one second layer part. This easily results in different material properties within the at least one first layer part and the at least one second layer part. This surprisingly provides multiple benefits. In this context, it was noted that the benefits are not restricted to the optimization of the manufacturing time. Furthermore, it was noted that the overall process can be optimized that way. Taking into account more and more complex designs the possibility to define less important layer parts of the component allows to significantly reduce the required processing capacity when simulating the final properties of such component. Even during the initial design such simplification reducing the overall simulation provides surprisingly significant impact. For example, it allows to concentrate the simulation on the most relevant parts, get a result to be reviewed leading to the decision whether the design can be kept, amended or disregarded. Based on current developments and expected demands for the near future such possibility represents a very valuable benefit.

A possible difference of the layer parts to be included is based on the thickness of the corresponding layers of the layer parts. According to further embodiments it is preferred that at least 90% of the layers of the at least one first layer part provide a thickness being at least 10%, more preferred at least 20%, even more preferred at least 25%, higher than the thickness of the layers of the at least one second layer part, based on the number of the layers. Typically, it is preferred that the aforementioned increase of the thickness refers to at least 95%, even more preferred at least 99%, even more preferred 100%, of the layers of the at least one first layer part, based on the number of layers. In general, it is preferred that the thickness within a layer is essentially the same. However, it is also possible for more advanced processes to provide an inhomogeneous thickness of such layer. In such case the aforementioned thickness of the layers of the at least one first layer part refers to the thickest part of the corresponding layers. For typical manufacturing processes the possibility to melt a thicker layer of the raw material allows to significantly increase the manufacturing speed of the corresponding layer, however, typically this results in a reduced quality. Thus, tailoring the design accordingly allows to easily adapt the design without impacting sensitive parts of the component.

In general, it is typically preferred that the first layer part and the second layer part are near to each other. According to further embodiments it is preferred that the at least one first layer part and the at least one second layer part are separated by at most 100 layers, more preferred at most 60 layers, even more preferred at most 40 layers. While it is possible to also include complex layer structures including a plurality of additional layers with different characteristics in between, it is typically beneficial for many embodiments that the defined first layer part and second layer part are relatively close to each other.

It is possible to utilize different materials for the different layer parts. However, according to further embodiments it is preferred that the at least one first layer part and the at least one second layer part consist of the same material like the same alloy. It was noted that simply optimizing the 3D printing process parameters provides the possibility to optimize the component and its manufacturing. Simultaneously, the present invention allows to make best use of the possibilities cutting down the effort required providing a realistic approach to optimize such system for industrial use.

Furthermore, it is possible to include multiple first layer parts and/or multiple second layer parts. According to further embodiments it is preferred that the component contains at least three first layer parts and/or at least three second layer parts, more preferred at least five first layer parts and/or at least five second layer parts, even more preferred at least 10 first layer parts and/or at least 10 second layer parts. This allows to, for example, define such first layer part and/or second layer part that are placed and amended with regard to the size by means of a simple optimization process. Especially, hardware systems providing low processing power make good use of such system cutting down the degree of freedom, however, simultaneously significantly decreasing the required processing power. This speeds up the overall process making it possible to be utilized also on quite old available systems.

Also, it is possible to define standard parameters for first layer parts and/or second layer parts. According to further embodiments it is preferred that the method contains providing multiple first layer parts and/or multiple second layer parts, wherein the manufacturing speed of at least two, more preferred at least three, first layer parts and/or at least two, more preferred at least three, second layer parts deviates less than 10%, more preferred less than 5%, based on the mass of material processed during a time interval, wherein the time interval is corrected by static time requirements not influenced by the process parameters. For example, such static time requirements are time intervals required to provide a new metal powder layer during a selective laser melting process using a recoater. Utilizing such standard process parameters allows to significantly reduce the time required to automatically provide suggestions of optimized manufacturing instructions. While the overall time saving is typically reduced that way the significantly reduced processing power required allows to perform corresponding optimization process utilizing available hardware as background process. This allows to easily implement the inventive method and provide a first impression with regard to potential benefits acquired with the inventive method.

A possibility to further improve the result for typical systems is to introduce an evaluation step based on planned usage and/or postprocessing. According to further embodiments it is preferred that the method contains the steps of—identifying layer parts of the component providing different requirements based on the planned usage and/or postprocessing of the component,—optimizing the manufacturing instructions by means of including at least one first layer part and at least one second layer part. For example, it is typically especially preferred to define layer parts requiring lower precision or less relevant to the structural stability and, thus, requiring lower quality. Structuring the component accordingly allows to significantly increase the speed of the 3D printing manufacturing method without losing the required properties.

Further degree of freedom to be considered during the provision of the manufacturing instructions is the orientation of the component. According to further embodiments it is preferred that the optimization of the manufacturing instructions include the selection of an optimized orientation of the components during the 3D printing process based on the at least one first layer part and at least one second layer part. Herein, it is especially preferred that such optimized orientation takes into account the total amount of layers that can be printed faster by selecting the orientation accordingly. In this context, such optimized orientation can also require additional support structures or more massive support structures resulting, for example, in an increased amount of material required for the 3D printing process. Although, such material is typically quite expensive the overall benefit to especially decrease the manufacturing time of the component typically significantly outclasses the loss of the additional material.

In case the 3D printing is to be utilized to build up on the surface of an existing component this improved orientation can even result in a further processing step prior to the 3D printing to remove excess material to allow such optimized orientation. However, preferably in case of 3D printing on an existing component the existing surface to be used for 3D printing is strongly taken into account to reduce the prior processing steps and additional layers to be printed.

It can be beneficial to define a manufacturing time threshold value to be utilized in the subsequent application of the inventive method. According to further embodiments it is preferred that the method takes into account a predefined manufacturing time threshold value, wherein the manufacturing time threshold value represents the required reduction of the manufacturing time of the component, wherein the method contains the steps of a) simulating a manufacturing time taking into account the possibility to split up the component into multiple layer parts containing the at least one first layer part and the at least one second layer part based on different requirements for different parts of the component b) comparing the simulated manufacturing time to the manufacturing time threshold limit, c1) simulating a further manufacturing time based on different at least one first layer part and at least one second layer part in case the first simulated manufacturing time does not fulfill the manufacturing time threshold limit and d) providing manufacturing instructions in case the first manufacturing time fulfills the manufacturing time threshold limit. This allows to provide an easy to assess feature for automatically optimizing the manufacturing instructions. It can be used to, for example, only forward suggestions fulfilling such requirement to a user for evaluation. Surprisingly, this can be easily implemented while significantly reducing the manual interaction and, thus, saving additional time and costs.

Furthermore, it was noted that it can be additionally or alternatively beneficial to provide a quality indicator, for example, based on predefined characteristics relevant for the corresponding component. According to further embodiments it is preferred that the method contains providing a quality indicator allowing to evaluate the quality of the resulting product. For example, such quality indicator might be based on the quality of the component if manufactured homogeneously using highest-quality layers. Herein, it might refer to the mechanical properties like structural stability or based on properties like the expected lifetime. While the selection of such quality indicator and its source seems challenging the overall benefit obtained herewith renders such additional effort almost irrelevant. Especially, it allows an easy information exchange between technical experts, technical experts and nontechnical experts, technical experts and sales members, supplier and customer, and so on. Also, it allows to assess the situation by a quick glance without requiring much time. Such quality identifier can also be provided in form of a ranking system with a number assigned to it like ranging from 1 to 10 or some ample system indicating, for example, components with low reliability by red and components with a high reliability by green. Further methods to provide such quality identifier available to persons skilled in the art and can be easily implemented to realize this embodiment of the invention. For typical embodiments it is preferred to provide such quality indicator as percentage relative to a defined quality.

Such quality indicator can furthermore be utilized to automate an optimization process. According to further embodiments it is preferred that method takes into account at least one predefined quality indicator c2) calculating at least one quality indicator of the component based on the intended split up of the component into multiple layer part, and simulating a further manufacturing time based on a different at least one first layer part and at least one second layer part in case the calculated at least one quality indicator does not fulfill the requirements of the at least one predefined quality indicator. Such predefined quality indicator can be defined for, for example, a specific component, a specific group of components, a specific material, the specific application, and so on. This allows to easily adapt the manufacturing based on the current needs and automatically provide an improved manufacturing instruction. Surprisingly, a further benefit obtained herewith is the possibility to easily solve spontaneous requests demanding, for example, the same component for a more strained utilization. Increasing the required quality indicator, automatically providing an improved manufacturing instruction and directly forwarding it to the 3D printing device allows to solve such challenges on very short notice. This provides the benefit to significantly cut down the respond time making best use of the possibilities provided by 3D printing.

Additionally or alternatively the method of adapting the design to provide the manufacturing instructions may take into account the tolerances available for the component. According to further embodiments it is preferred that the method provides manufacturing instructions including the at least one first layer part and at least one second layer part, wherein the at least one second layer part provides a higher manufacturing speed compared to the at least one first layer part, wherein the at least one second layer part is assigned to at least one part of the component providing higher tolerances compared to a part of the component the at least one first layer part is assigned to. It was noted that utilizing tolerances available for different parts of the component allows to get at least a first idea where to assign the different layer parts. Although, it is typically required to further analyse the resulting properties of the component such approach typically at least provides a good starting point to provide improved manufacturing instructions.

According to further embodiments the method contains the steps of—reviewing the tolerances associated to different parts of the component, and—providing manufacturing instructions, wherein the positions of the at least one first layer part and the at least one second layer part are at least partially based on the tolerances. Like stated above such approach was surprisingly beneficial to typically provide an optimized design of the component within a shorter timeframe based on typically available data.

Surprisingly, it was noted that for many cases the optimization can be stopped after a defined number of repetitions. According to further embodiments it is preferred that the method takes into account a predefined maximum number of repetitions of step c2), wherein in case the maximum number of repetitions of step c2) is reached an output is generated. Such output can, for example, contain a request regarding a possible lowering of the predefined quality indicator and/or an information that the corresponding manufacturing time threshold volume cannot be fulfilled. Additionally or alternatively such output can be provided after a predefined time limit. It was noted that for many embodiments such methods providing a result after a defined number of repetitions and/or time are typically very beneficial. Such output can also contain suggestions of possible amendments that might be included to fulfill the predefined manufacturing time threshold value. Typically, it is preferred that such output also contains information with regard to the deviation of the best manufacturing time simulated to the predefined manufacturing time threshold value. Surprisingly, it is furthermore possible to give some first evaluation how much additional time is required to provide a predefined quality indicator.

Furthermore, the present invention may contain a restriction with regard to expected manufacturing time to be saved. According to further embodiments it is preferred that the method takes into account a predefined manufacturing time reduction, wherein the method contains the steps of g) simulating at least one manufacturing time taking into account the possibility to split up the component into multiple layer parts containing the at least one first layer part and the at least one second layer part based on different requirements for different parts of the component h) comparing the simulated at least one manufacturing time to the predefined manufacturing time reduction, and i1) in case the simulated at least one manufacturing time fulfills the predefined manufacturing time reduction providing an information to an user that the manufacturing time can be reduced by applying a correspondingly adapted manufacturing method. Such system can be surprisingly very beneficially utilized to provide some system working the background. Herein, the user receives suggestions that the corresponding adaption of the manufacturing instructions may be utilized to provide an improvement. It was noted that such system is very well received and is easily included in an existing workflow. This allows to not only smoothly change an existing system, but also reduce the downtime during such change and, thus, corresponding losses occurring during such transition time to a minimum.

In this context, it is possible to directly provide corresponding manufacturing instructions. According to further embodiments it is preferred that the method contains step j) providing manufacturing instructions including the at least one first layer part and the at least one second layer part. Herein, such manufacturing instructions do not necessarily have to be transmitted to an user, but can be directly provided to a 3D printing device. It is possible that the user might directly select whether he is interested in the corresponding manufacturing instructions including the optimized design resulting in only set manufacturing instructions being provided. However, to increase the overall process it is preferred for typical embodiments to provide such optimized manufacturing instructions along the normal manufacturing instructions. This, for example, allows to select the corresponding manufacturing instructions at a later point and instantly start the manufacturing process. It was noted that this is surprisingly beneficial, as, for example, it becomes possible to let corresponding optimizations being performed overnight while the user selects the corresponding manufacturing instructions to be printed right in the morning to monitor the subsequent manufacturing process.

Beneficially for many applications cases the inventive method utilizes a predefined quality indicator. According to further embodiments it is preferred that the method takes into account at least one predefined quality indicator i2) calculating at least one quality indicator of the component based on the intended split up of the component into multiple layer part, and simulating a further manufacturing time based on a different at least one first layer part and at least one second layer part in case the calculated at least one quality indicator does not fulfill the requirements of the at least one predefined quality indicator. Such embodiments further reduces the effort required by the user and simplifies his evaluation. It was further noted that the technical expert utilizes such quality indicator not only for sorting out the results, but also identifying possible candidates to be evaluated more closely. Surprisingly, corresponding feedback can be coupled with an optimization of the quality indicator. For example, such system or other embodiments as described above and below can be coupled with a machine learning process. Herein, a correspondingly acquired feedback in this context can be also utilized to trigger some reinforced learning process.

A further modification of the inventive method being typically beneficial utilizes the possibility to automatically select a quality indicator depending on the specific case. According to further embodiments it is preferred that the method determines at least one quality indicator being provided to the user along with the simulated manufacturing time. It was noted that it is typically very beneficial to provide the corresponding quality indicator depending on the part to be printed along with the possible reduction of manufacturing time. This allows the user to easily evaluate whether the time reduction still provides the required quality and should be utilized. Surprisingly, this also provides the possibility to make best use of the technical experience of the technical expert. While the calculation is done in the background the system lacking corresponding experience simply requests the opinion of the technical expert. The achieved cooperation between the computer system and the technical expert working as a team in this context is surprisingly beneficial and efficient.

For many applications it is further beneficial to provide multiple possibilities to select from. According to further embodiments it is preferred that the method contains that at least two, more preferred at least four, simulated manufacturing times and optionally at least one quality indicator of each manufacturing time being forwarded to the user, wherein such optional at least one quality care indicator might be excluded in case the deviation of quality is deemed to be irrelevant. Typically, it is preferred that the method includes providing such at least one quality indicator in case the deviation of quality is not deemed to be irrelevant. Surprisingly, it was noted that corresponding simulations are easily provided during typical times of inactivity of the hardware. Providing the user with the corresponding selection allows to swiftly and accurately optimize the manufacturing process by clicking on the desired reduction of manufacturing time optionally taking into account the at least one quality indicator provided along. The evaluation whether the corresponding optional quality indicator is to be considered being irrelevant can be based on corresponding threshold values and/or standard deviations of corresponding simulations and measurements.

The inventive methods typically beneficially makes use of a data storage containing former 3D printing instructions. According to further embodiments it is preferred that the methods contains the steps of—retrieving data from a data storage containing data of former manufacturing instructions and/or data of results of 3D printing processes,—identifying similar 3D printing processes, and—providing manufacturing instructions at least partly based on the data retrieved from the data storage.

According to further aspect the present invention refers to a component manufactured according to the inventive method.

An example of components especially beneficially utilizing the inventive method originates within the area of continuous flow engines. According to further embodiments it is preferred that the component is a continuous flow engine component. Herein, it was noted that the inventive method, for example, can be very beneficially utilized for hot gas path components of such continuous flow engines. For example, the present invention can be utilized to manufacture compressor vanes, compressor blades, heat shields, burners, turbine vanes and/or turbine blades.

To provide such component different 3D-printing methods can be utilized. It was noted that selective laser melting (SLM) or electron beam melting (EBM) are typically especially beneficially utilized. According to further embodiments it is preferred that the component has been manufactured using a metal powder or metal composition powder. Applying the inventive method to corresponding manufacturing methods is surprisingly easy and achieves very good results.

The inventive method and its embodiments as described herein may be embodied by a computer program product or a plurality of computer program products, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

According to further aspect the present invention refers to a computer program product, tangibly embodied in a machine-readable storage medium, including instructions operable to cause a computing entity to execute an inventive method.

The term "computer" refers to any electronic device comprising a processor, such as a general-purpose central processing unit (CPU), a specific purpose processor or a microcontroller. The processor is adapted to execute a special computing task, namely for providing the load skewness result. A computer is capable of receiving data (an input), of performing a sequence of predetermined operations thereupon, and of producing thereby a result in the form of data or signals (an output). Depending on context, the term "computer" will mean either a processor in particular or can refer more generally to a processor in association with an assemblage of interrelated elements contained within a single case or housing.

The computer program product may be processed in a distributed manner, such as that certain steps are performed on a first computing entity (e.g. at the turbine) and that other steps are performed on a second computing entity (e.g. on a central server).

The computer program product may be offered, placed on market, used, imported and/or stored as (and thus may be part of) a computer program product. Thus, the computer program product may be provided on a storage medium (computer readable medium, like a computer disc or a memory stick etc.). Alternatively, the computer program product may be provided via download by means of a respective network connection to a server, which stores the computer program product by providing a link to the server with the computer program product stored thereon. A "computer-readable medium" or "storage medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The computer program product according to further embodiments is adapted to execute the embodiments of the inventive method and the embodiments of the inventive system. In this context, it has to be understood that each single or a combination of the specific embodiments as described above can be utilized to modify the computer program product as specified.

According to further embodiments it is preferred that the computer program product contains a learning mechanism, wherein the learning mechanism reviews prior manufacturing instructions and/or prior results of the inventive method to provide new manufacturing instructions. For example, such learning mechanism can be based on some artificial intelligence.

According to further aspect the present invention refers to a storage device for providing an inventive computer program product, wherein the device stores the computer program product and/or provides the computer program product for further use.

According to further aspect the present invention refers to a system comprising a processor and a non-transitory computer readable medium comprising computer executable instructions that when executed by the processor cause the system to perform operations comprising: providing manufacturing instructions for manufacturing a component using 3D printing, wherein the manufacturing method contains at least the steps of providing a plurality of layers forming at least a part of the component, wherein the plurality of layers contains at least a first layer part and a second layer part, wherein part of the component containing the at least one first layer part and the part of the component containing the at least one second layer part have been manufactured with different manufacturing speeds. Herein, such system can be utilized to execute an inventive computer program product.

Such system can typically beneficially be connected to a 3D printing device. According to further embodiments it is preferred that the system is adapted to be connected to an 3D printing device to transfer the manufacturing instructions to the 3D printing device. Although, such connection can be directly or indirectly it is a typically preferred that the manufacturing instructions are at least directly stored on a data storage being permanently connected to the 3D printing device. This allows the 3D printing device to retrieve the data as required being surprisingly beneficial as it was noted that the more complex designs easily provide problems to be stored on the limited storage space of available 3D printing devices.

Alternatively, the manufacturing instructions can be stored on the data storage being only temporarily connected to the 3D printing device. It was noted that such embodiment is typically beneficial for cases strongly depending on the interaction with the user. Herein, the accessibility by the user becomes surprisingly important. It was noted that such system can be beneficially coupled with an existing system working off a number of components to be printed. Herein, the system can, for example, check right before starting the 3D printing process or at a defined time whether a corresponding improved manufacturing instruction is available for one or more of the print jobs in the queue.

The inventive system can also be realized in the form of a control device being adapted to control a 3D printing device. In such case, the inventive system is directly connected to the 3D printing device and executes the manufacturing instructions itself. Including it in the corresponding 3D printing device requires quite a bit of processing power to be additionally included in such device increasing its costs. Surprisingly, this misfit is deemed to be less important. A modular system to be easily implemented in an existing 3D printing facility is readily accepted as it allows to flexibly upgrade an existing facility being surprisingly beneficial.

Furthermore, the inventive system may beneficially utilize a data storage containing historic data. According to further embodiments it is preferred that the system is connected to a data storage containing former 3D printing instructions and/or data related to the results of 3D printing processes. This allows to utilize experience collected in the past to, for example, further improve the manufacturing instructions and/or select an improved starting point of the design already containing a certain arrangement of at least one first layer part and at least one second layer part to speed up the process of providing the optimized manufacturing instructions. Especially, it was noted that it is surprisingly beneficial to reduce the numbers of repetitions required during a refinement stage to provide the desired optimization of the manufacturing instructions.

According to a further aspect the present invention refers to a computing device adapted to provide manufacturing instructions for an 3D printing device, wherein the computing device is adapted to execute an inventive method or contains an inventive computer program product. Preferred embodiments of the computing device realize embodiments as described above with regard to the inventive system.

According to a further aspect the present invention refers to a 3D printing device being connected to, preferably containing, an inventive system or computing device.

According to a further aspect the present invention refers to an additive manufacturing workshop containing an inventive system or an inventive 3D printing device.

According to further embodiments it is preferred that the 3D printing device is adapted to retrieve manufacturing instructions from a database, preferably a distributed database, wherein before starting the 3D printing process it is checked whether updated manufacturing instructions are available to replace the manufacturing instructions already provided to be used by the 3D printing device. Herein, such updated manufacturing instructions contain the inventive design providing at least one first layer part and at least one second layer part. The manufacturing instructions already being available on the other hand can be some simple manufacturing instructions containing no inventive layer part structure. For example, such manufacturing instructions only provide instructions to manufacture the component as homogeneous structure. However, such manufacturing instructions being already available can also be some manufacturing instructions already containing an inventive at least one first layer part and at least one second layer part. For example, such already inventive design can be further improved resulting in such replacement. Also, an alternative manufacturing instruction might be provided that is adapted to a different application. In such cases a user might be requested to select the specific application case to allow the 3D printing device to select the best optimized manufacturing instruction. Also, such updated manufacturing instructions can, for example, be based on amended manufacturing time requirements and/or quality requirements.

According to further aspect the present invention refers to a use of manufacturing instructions for manufacturing a component using 3D printing, wherein the manufacturing instructions contain a 3D printing method step, wherein the 3D printing method step contains providing a plurality of layers forming at least a part of the component, wherein the plurality of layers contains at least a first layer part and a second layer part, wherein part of the component containing the at least one first layer part and the part of the component containing the at least one second layer part have been manufactured with different manufacturing speeds.

The embodiments as described above as described, for example, with regard to the inventive method can be combined to also acquire additional benefits beyond the benefits described for the single embodiments.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

Figure 1:
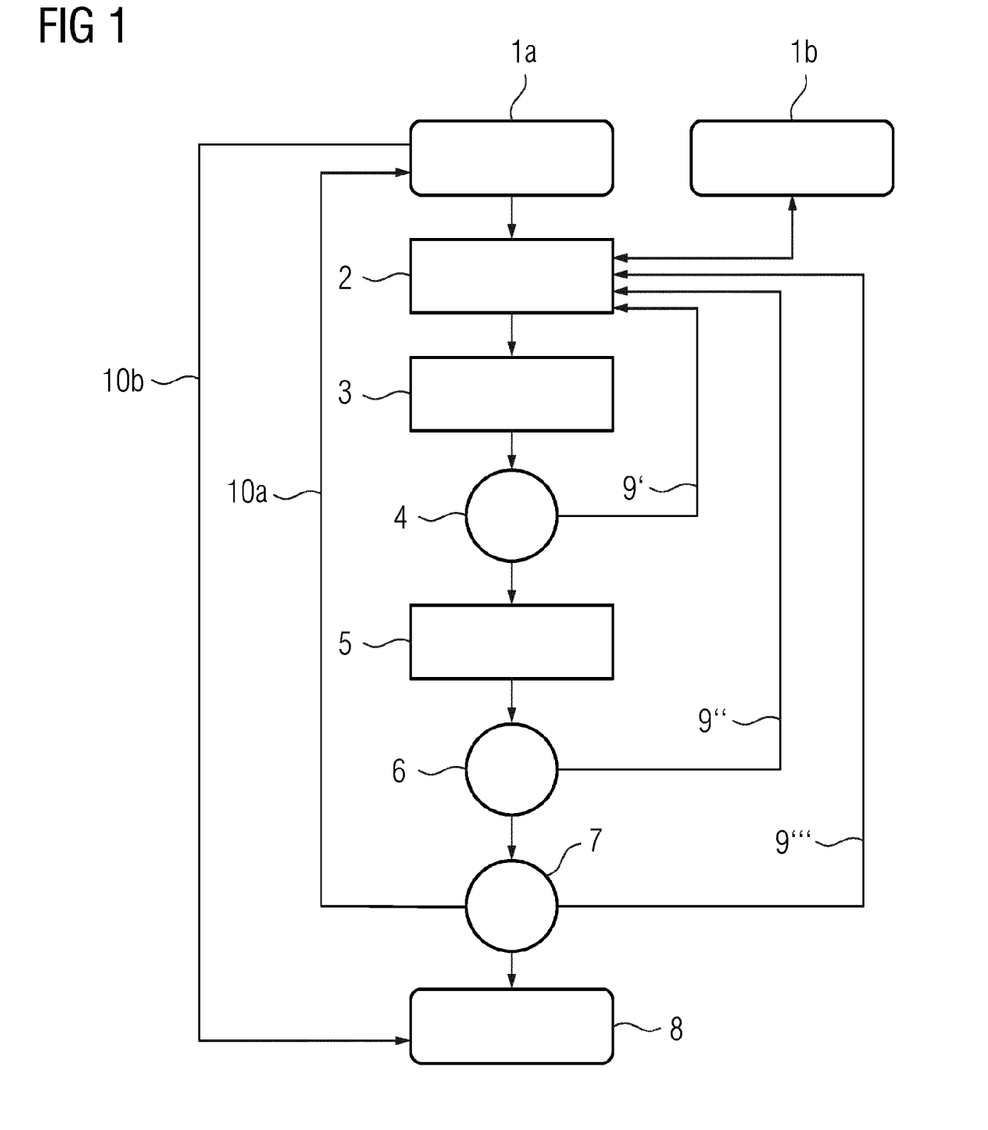
FIG. 1 shows a scheme of an embodiment of the inventive method.

FIG. 1 shows a scheme of an embodiment of the inventive method. Herein, the optimizing process of a design of the gas turbine vane is shown. The design is stored in the database 1a. From the database 1a such design is retrieved by an inventive system. The inventive system executes the inventive method and provides manufacturing instructions in step 2 for manufacturing the component using 3D printing. Herein, the system retrieves comparable data regarding former 3D printing processes and/or optimizing processes according to inventive method from the database 1b. In case it is considered beneficial the collected data of database 1b is utilized to provide an improved manufacturing instruction according to the present invention. Herein, single elements of former 3D printing processes can be utilized for a comparable design and split up into different layer parts is utilized as starting point to provide the specific layout for the intended component.

The manufacturing method contains providing a plurality of layers forming the component. The plurality of layers provided contains multiple first layer parts and a second layer part, wherein the first layer parts and the second layer part each contain more than 30 layers of the plurality of layers. The manufacturing speed of the parts of the component containing the first layer parts and the manufacturing speed of the part of the component containing the second layer part are different, wherein the manufacturing speed of the second layer part is significantly higher. The 3D printing process has been performed utilizing a selective laser melting device, wherein the nickel superalloys powder is melted layer by layer to manufacture the gas turbine vane.

The inventive system is executed on a computer including a data storage storing a computer program product executing the inventive method. Herein, the computer program product evaluates certain requirements like areas of increased strain, experiences from long term usage and maintenance data to provide an improved design fitting the specific component.

The different manufacturing speeds of the layers of the first layer parts and the second layer part result from different process parameters utilized during the 3D printing process. During the 3D printing of the layers of the first layer parts the laser of the selective laser melting device is utilizing a relatively low energy output including remelting already available layer parts to provide the high quality layer part with exactly defined geometric shape as well as microstructure. The contrary, the layers of the second layer part are melted utilizing a higher energy output of the laser and do not include remelting processes. The higher amount of energy introduced by the laser within the same time allows to speed up the process. Therefore, the manufacturing time of the part of the component containing the second layer part required to process a comparable amount of material compared to the first layer parts is significantly reduced.

The different process parameters also result in the different surface quality of the exterior of the second layer part. Herein, the outer surface of the second layer part is significantly rougher compared to the outer surface of the first layer parts. The increased roughness is, however, of little importance for the later application, as the second layer part is located within an area of the gas turbine vane being subject to a post processing step including grinding resulting in a removal of such roughness. On the contrary, the first layer parts are located within an area of the gas turbine vane that is typically not subject to such postprocessing and would provide significant additional effort to apply such postprocessing step at this location.

Furthermore, the first layer parts have been located within parts of the gas turbine vane being highly strained during the intended usage. This specific and defined microstructure resulting from the exactly controlled 3D printing process increases the overall strength of the component in this location. This improved properties at the location of the first layer parts reduce the chances of subsequent damages during usage and, thus, provide the possibility to increase the maintenance intervals as well as increases the overall lifetime of the component. The lower stability within the area of the part the second layer part has been assigned to, however, provides little to no influence of the usage and lifetime of the component. Based on the significantly lower strain of the component within said area the reduction of manufacturing time does not negatively influence the applicability or life of the component. It has to be noted that for the specific case this example refers to not only the generic usage has been considered. The specific layout of the arrangement of the first layer parts and second layer parts also includes long-term data and the specific strains resulting from an application for energy production being no baseload power plant. Taking into account the collected data with regard to the specific intended usage indicated that an increased strain in certain areas compared to baseload usage. Furthermore, a differing wear profile was noted. To solve these problems the first layer parts have been located and correspondingly important elements of the gas turbine vane to reinforce said parts, decrease the wear and increase the overall lifetime.

During step 3 the manufacturing time resulting from the intended design of the component is simulated. Herein, the manufacturing time to print the specific layers based on the process parameters is taken into account as well as the related requirements like cooling down periods to influence the microstructure, application of the next powder layer, potential interaction steps in between, and so on.

During step 4 the simulated manufacturing time is compared to a predefined manufacturing time threshold value and evaluated whether it fulfills the requirements. In case it does not fulfill the requirement an action 9' is triggered resulting in restarting step 2 to provide the different layout for evaluation.

In case the simulated manufacturing time fulfills the requirements step 5 takes place containing the determination of multiple quality indicators. In the specific case referred to the year the mechanical stability and overall lifetime also including possible deviations from the intended usage within a certain limit are evaluated to provide overall scores indicating the quality of the component. Herein, the scores are based on a comparison example, wherein said comparison example represents the same parts manufactured with a homogeneous quality excluding such specific design including at least one first layer part and at least one second layer part.

During step 6 an automatic evaluation takes place whether said quality indicators fulfill the requirements and eventually action 9" is triggered resulting in step 2 to be started anew.

During step 7 an optional assessment by a user takes place, wherein the user evaluates the simulated manufacturing time as well as the quality indicators. In case he is, for example, not satisfied with the saved manufacturing time and/or does not agree with the suitability of the component taking into account the quality indicators the user can trigger action 9''' to start step 2 again. Furthermore, he can also influence the threshold values of the quality indicators to increase requirements during the evaluation of step 6. Additionally, the user can manually trigger step 10a to replace or additionally store the amended design in the data storage 1a.

In case the user is satisfied with the result during the optional evaluation the manufacturing instructions are forwarded to the 3D printing device 8. While the 3D printing device is unable to also retrieve manufacturing instructions from the database 1a by means of 10b it furthermore checks before starting the printing process whether an updated manufacturing instruction is available from the inventive method as described above. In the specific example described manufacturing data is directly forwarded to the 3D printing device. Furthermore, the corresponding manufacturing data optimized for an improved manufacturing can, for example, also be stored in a distributed database allowing available 3D printers located somewhere in the world to retrieve the corresponding manufacturing instruction and immediately start the manufacturing of the required component.

Figure 2:
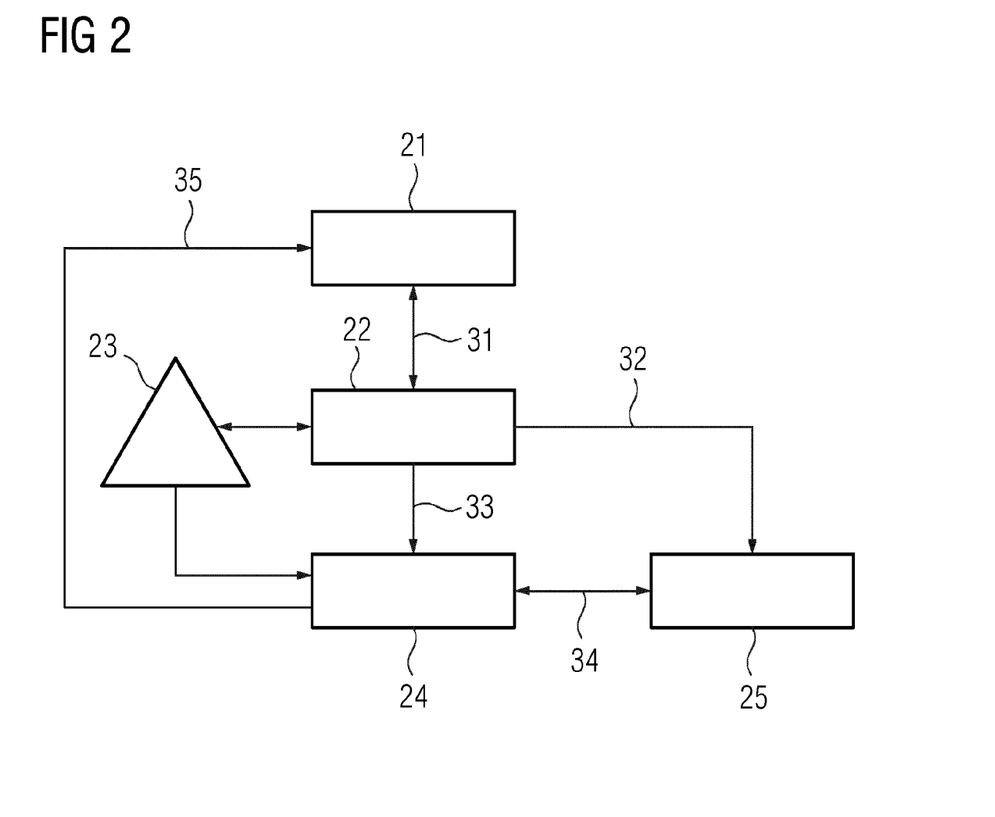
FIG. 2 shows a scheme of an inventive system executing the inventive method.

FIG. 2 shows a scheme of an inventive system 22 executing the inventive method. Herein, the system 22 is adapted to retrieve and store data by means of connection 31 in the database 21. The system 22 utilizes connection 31 to, for example, retrieve the original design data including the original manufacturing instructions from the database 21. Herein, the data retrieved from the database 21 also includes CAD data of the component being transformed into manufacturing data for the 3D printing device 25. The manufacturing instructions acquired with the inventive method can also be stored in the database 21 for later use.

The system 22 is furthermore adapted to interact with a user interface 23. This enables the user to review the process of the inventive method and eventually interact based on, for example, quality indicators provided or other observations rendering such interaction beneficial. Also, the user is able to request data from the system. For example, the user can retrieve the current queue of manufacturing instructions being processed according to the inventive method or how much time and tries are utilized to optimize the specific manufacturing process. Additionally, the user can retrieve data regarding the improvement achieved during the repeated steps of inventive method to get an impression whether it is reasonable to force further repetition steps to maybe further decrease the required manufacturing time.

The user interface as shown in the example of FIG. 2 is also able to manually decide to store manufacturing instructions provided by system 22 by means of connection 33 to the distributed database 24. Also, it can be manually decided to replace a manufacturing instruction stored on the distributed database 24. Typically, the system 22 stores the improved manufacturing instructions by means of connection 33 in the distributed database 24 in case certain threshold values are achieved. Such threshold values are especially referring to the manufacturing time and the quality. In case the benefit obtained is considered to be below a certain threshold value a manufacturing instruction already contained in the distributed database 24 is at least not replaced. Either the improved manufacturing instruction is stored in addition to an existing one in the distributed database 24 or it directly triggers a request to the user to decide whether the manufacturing instruction already available should be maintained or replaced.

The system 22 is furthermore able to utilize connection 32 to inform the 3D printing device 25 that an updated manufacturing instruction is available on the distributed database 24. The 3D printing device 25 can retrieve the corresponding manufacturing instructions from the distributed database 24 itself unless it is already automatically forwarded by the distributed database 24. Such double check to provide the 3D printing device 25 with the new manufacturing instructions significantly increases the reliability and especially rules out that based on some delay or miscommunication along the communication lines 34 prevents that the new manufacturing instructions are utilized. Also, in case the user has still to review whether the new manufacturing instructions are to be utilized this information provided along connection 32 allows the 3D printing device to be correspondingly informed and also reschedule the print job to enable making use of this improved manufacturing instruction.

The disputed database 24 is furthermore adapted to utilize connection 35 to store the improved manufacturing instructions in the database 21. This allows that the system 22 may skip the corresponding optimization of the manufacturing instructions based on already available improvements acquired from the database 21. Furthermore, the system 22 is adapted to make use of corresponding improved manufacturing instructions already available in the database 21 to provide an improved starting point to search for additional optimizations that might be introduced in the design. The decision whether the existing optimized manufacturing instructions are utilized or optimized manufacturing instructions are utilized as starting point for a further optimization process can be based on, for example, the simulated manufacturing time or quality indicators that are provided along the manufacturing instructions and an evaluation whether chances are high to provide a significant benefit by processing it again.

Figure 3:
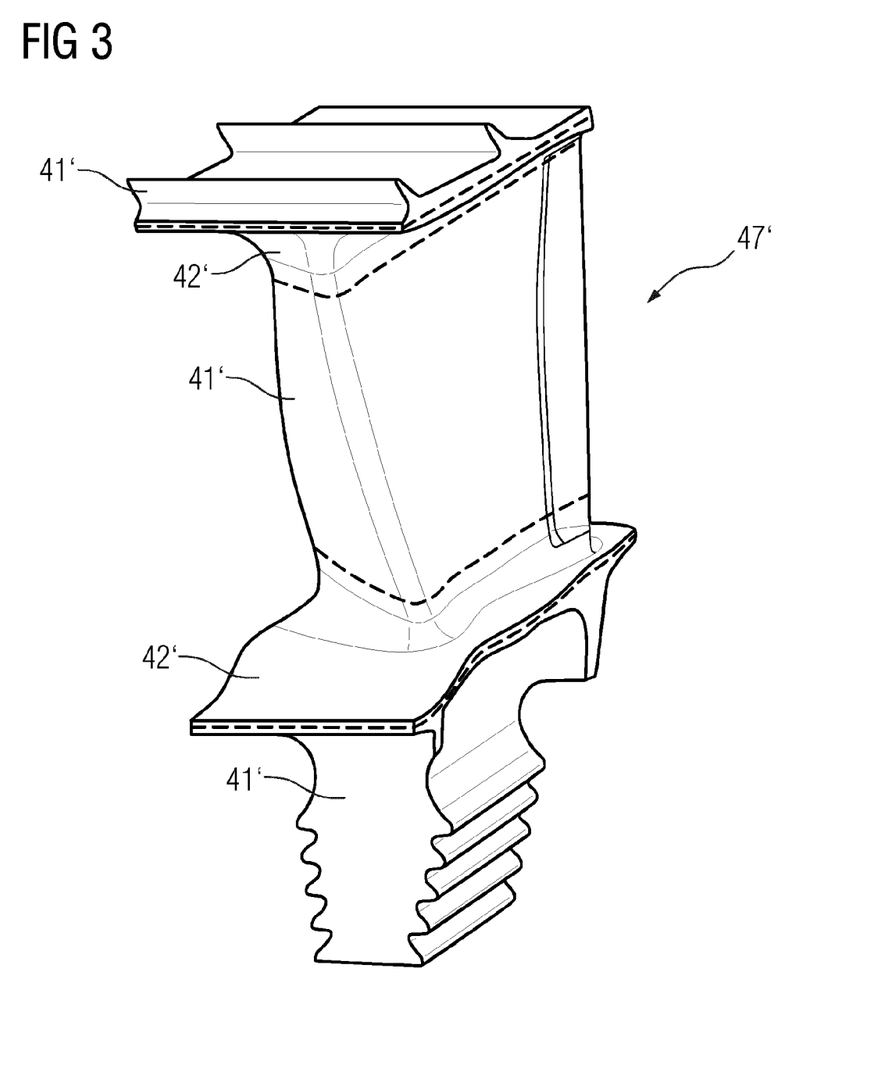
FIG. 3 shows a schematic sideview of a vane as example of an inventive component, wherein the different layer parts are indicated.

FIG. 3 shows a schematic sideview of a gas turbine vane 47' as example of an inventive component, wherein the different layer parts are indicated. The complete vane 47' consists of multiple first layer parts 42' and second layer parts 41'. The lines included in the figure indicate the borders between the first layer parts and second layer parts. The borderline itself consists of less than 10 layers not explicitly representing layers as utilized in the first layer parts 42' and second layer parts 41'.

The second layer parts 41' are utilized to provide the attachment parts on the bottom and the top of the vane 47'. Furthermore, a second layer part 41' is located in the middle of the vane 47'. The first layer parts 42' are connecting the attachment parts at the bottom and the top with the middle part of the vane 47'. Such design is especially useful in case of simple vanes 47' that are subject to a significantly increased strain on the connecting parts resulting in an improved amount of cracks and damages in these areas. Furthermore, based on the lower curvature of the middle part of the vane between the connecting elements the post processing step removing surface roughness at this point is significantly simplified. The attachment parts located at the bottom and the top on the other hand are not subject to the hot gas path and the increased roughness of its surface does not negatively impact utilization of the vane 47'. This is also verified by the tolerances provided for this part of the vane 47' being included in the CAD files indicating that the inventive method might beneficially utilize the second layer parts in this area.

Figure 4:
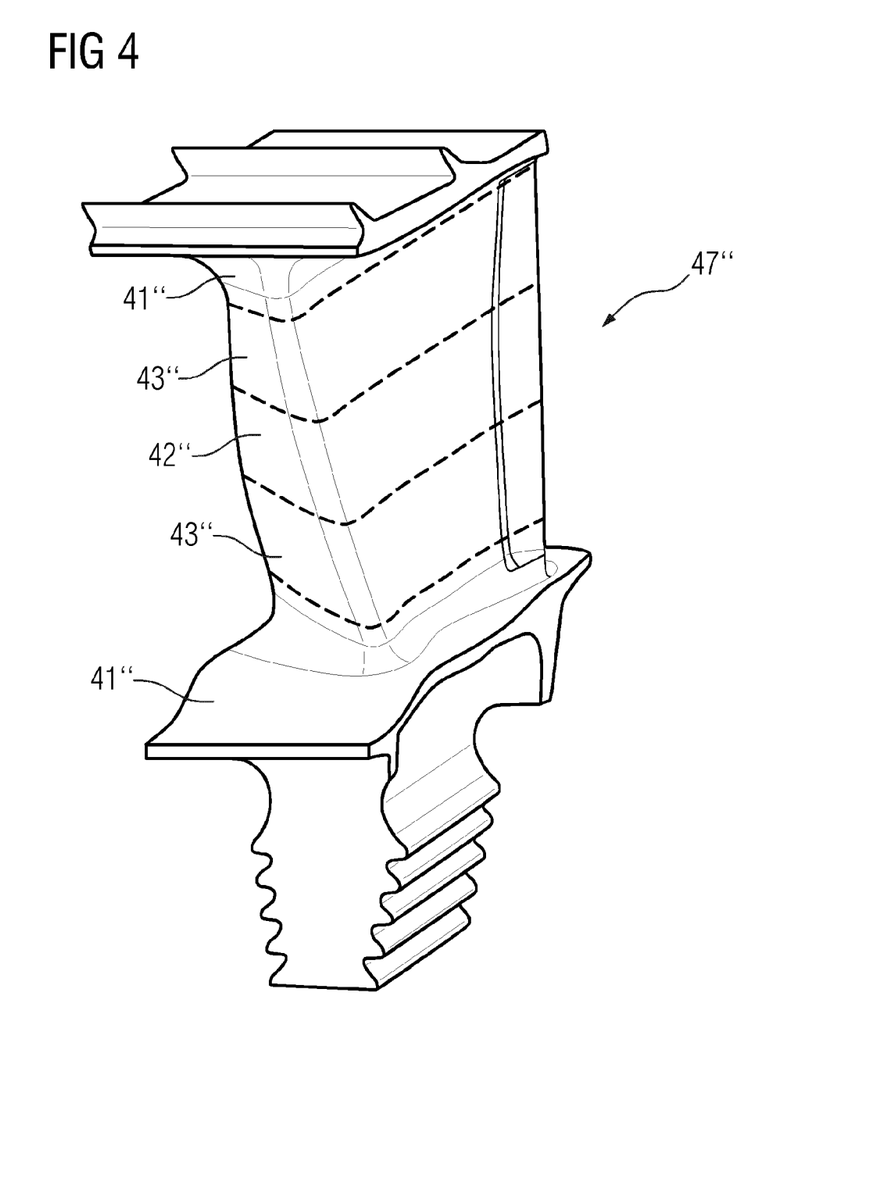
FIG. 4 shows a schematic sideview of a further vane as example of an inventive component, wherein a different setup of the layer parts is provided.

FIG. 4 shows a schematic sideview of a further vane 47" as example of an inventive component, wherein a different setup of the layer parts is provided. The strain on the connecting parts connecting the attachment parts located on the bottom and top with the middle part of the vane 47" is significantly lower in this case. Furthermore, for the specific application of the vane 47" as shown in FIG. 4 the flow of the hot gas through the continuous flow engine is less impacted by an increased surface roughness of the attachment parts. Therefore, it does not negatively impact to correspondingly assign second layer parts at these locations.

To reduce the manufacturing time, for example, the thickness of the layers of the second layer parts has been increased by 20% and the energy output of the laser of the selective laser melting 3D printing device has been increased to compensate for the additional amount of material to be melted. The second layer parts 41" extend over a bigger part of the vane 47". Between the second layer parts 41" and the first layer part 42" two third layer parts 43" are arranged being manufactured with a medium speed.

The first layer part 42" provides the plurality of specifically designed film cooling holes not shown in FIG. 4. Based on the specific design of the film cooling holes great care has to be taken to manufacture this part of the vane 47". The process parameters of the 3D printing process optimized to provide highest quality and accuracy within this area.

The scope of protection of the present invention is specified by the appended claims and is not restricted by the features explained in the description or shown in the drawing.

The invention claimed is:

1. A method of providing manufacturing instructions for manufacturing a component using 3D printing, wherein the manufacturing method comprises:
providing a plurality of layers forming at least a part of the component,
wherein the plurality of layers contains at least one first layer part and at least one second layer part,
wherein the at least one first layer part and the at least one second layer part have been manufactured with different manufacturing speeds;
wherein the method takes into account a predefined manufacturing time threshold value,
wherein the manufacturing time threshold value represents a required reduction of a manufacturing time of the component,
wherein the method further comprises:
a) simulating a manufacturing time taking into account the possibility to split up the component into multiple layer parts containing the at least one first layer part and the at least one second layer part based on different requirements for different parts of the component,
b) comparing the simulated manufacturing time to the manufacturing time threshold limit,
c1) simulating a further manufacturing time based on different at least one first layer part and at least one second layer part in case the first simulated manufacturing time does not fulfill the manufacturing time threshold limit, and
d) providing manufacturing instructions in case the first manufacturing time fulfills the manufacturing time threshold limit.

2. The method according to claim 1,
wherein the at least one first layer part and the at least one second layer part contain at least 10 layers.

3. The method according to claim 1,
wherein the component provides at least one first part of the component containing the at least one first layer part and at least one second part of the component containing the at least one second layer part,
wherein the first part and the second part of the component provide different surface qualities.

4. The method according to claim 1,
wherein the method takes into account a possible and/or a required postprocessing step,
wherein the position and/or size of the at least one first layer part and/or the position and/or size of the at least one second layer part takes into account a modification resulting from the possible and/or required postprocessing step.

5. The method according to claim 1,
wherein at least 90% of the layers of the at least one first layer part provide a thickness being at least 10% higher than the thickness of the layers of the at least one second layer part, based on the number of the layers.

6. The method according to claim 1, wherein the method further comprises:
identifying layer parts of the component providing different requirements based on the planned usage and/or postprocessing of the component,
optimizing the manufacturing instructions by including at least one first layer part and at least one second layer part.

7. The method according to claim 1, wherein the method further comprises:
providing a quality indicator allowing to evaluate the quality of the resulting product, wherein the method preferably takes into account at least one predefined quality indicator,
c2) calculating at least one quality indicator of the component based on the intended split up of the component into multiple layer parts, and simulating a further manufacturing time based on a different at least one first layer part and at least one second layer part in case the calculated at least one quality indicator does not fulfill the requirements of the at least one predefined quality indicator.

8. The method according to claim 1,
wherein the method provides manufacturing instructions including the at least one first layer part and at least one second layer part,
wherein the at least one second layer part provides a higher manufacturing speed compared to the at least one first layer part,
wherein the at least one second layer part is assigned to at least one part of the component providing higher tolerances compared to at least one part of the component the at least one first layer part is assigned to.

9. The method according to claim 1, further comprising:
retrieving data from a data storage containing data of former manufacturing instructions and/or data of results of 3D printing processes,
identifying similar 3D printing processes, and
providing manufacturing instructions at least partly based on the data retrieved from the data storage.

10. A component manufactured according to the method according to claim 1.

11. A computer program product, tangibly embodied in a non-transitory machine-readable storage medium, comprising:
instructions stored thereon and operable to cause a computing entity to execute a method according to claim 1.

12. A system for performing the method of claim 1, comprising:
a processor and a non-transitory computer readable medium comprising computer executable instructions that when executed by the processor cause the system to perform operations comprising:
providing manufacturing instructions for manufacturing a component using 3D printing, wherein the manufacturing method comprises:
providing a plurality of layers forming at least a part of the component, wherein the plurality of layers contains at least a first layer part and a second layer part,
wherein the at least one first layer part and the at least one second layer part have been manufactured with different manufacturing speeds.

13. A 3D printing device, comprising:
a system according to claim 12.

14. A method for manufacturing a component using 3D printing, comprising:
providing a plurality of layers forming at least a part of the component,
wherein the plurality of layers contains at least one first layer part and at least one second layer part,
wherein the at least one first layer part and the at least one second layer part are manufactured with different manufacturing speeds;
wherein the method takes into account a predefined manufacturing time threshold value,
wherein the manufacturing time threshold value represents a required reduction of a manufacturing time of the component,
wherein the method further comprises:
a) simulating a manufacturing time taking into account the possibility to split up the component into multiple layer parts containing the at least one first layer part and the at least one second layer part based on different requirements for different parts of the component,
b) comparing the simulated manufacturing time to the manufacturing time threshold limit,
c) simulating a further manufacturing time based on different at least one first layer part and at least one second layer part in case the first simulated manufacturing time does not fulfill the manufacturing time threshold limit, and
d) providing manufacturing instructions for the method in case the first manufacturing time fulfills the manufacturing time threshold limit.

15. The component of claim 10,
wherein the component comprises a continuous flow engine component.

* * * * *